(12) United States Patent
Ishibashi et al.

(10) Patent No.: US 7,327,067 B2
(45) Date of Patent: Feb. 5, 2008

(54) ACTUATOR MODULES

(75) Inventors: Masayoshi Ishibashi, Tokyo (JP); Midori Kato, Kawagoe (JP)

(73) Assignee: Hitachi, Ltd., Tokyo (JP)

( * ) Notice: Subject to any disclaimer, the term of this patent is extended or adjusted under 35 U.S.C. 154(b) by 128 days.

(21) Appl. No.: 11/337,560

(22) Filed: Jan. 24, 2006

(65) Prior Publication Data
US 2006/0238065 A1    Oct. 26, 2006

(30) Foreign Application Priority Data
Apr. 26, 2005  (JP) ............................. 2005-127311

(51) Int. Cl.
*H01L 41/053* (2006.01)
(52) U.S. Cl. ..................... 310/311; 310/344
(58) Field of Classification Search ............... 310/311, 310/324, 365, 800, 340, 344
See application file for complete search history.

(56) References Cited

U.S. PATENT DOCUMENTS

2003/0008192 A1*  1/2003  Freund et al. ................ 429/37

2007/0152543 A1*  7/2007  Hattori et al. .............. 310/800

FOREIGN PATENT DOCUMENTS

| JP | 02-020586 | 7/1988 |
| JP | 06-006991 | 6/1992 |
| JP | 2000-083389 | 10/1998 |
| JP | 2005-176412 | 12/2003 |

OTHER PUBLICATIONS

Ishibashi, Masayoshi, et al., "An extensional actuator using composites based on ionic polymer and minute carbon particles", Polymer Reprints, Japan, vol. 53, No. 1, 2004, pp. 1349 (with English abstract).

* cited by examiner

*Primary Examiner*—Darren Schuberg
*Assistant Examiner*—Derek Rosenau
(74) *Attorney, Agent, or Firm*—Reed Smith LLP; Stanley P. Fisher, Esq.; Juan Carlos A. Marquez, Esq.

(57) ABSTRACT

A lightweight, compact, and flexible organic actuator module that is stably operated in a gas such as air and safely handled has a structure in which an organic actuator and a counter electrode immersed in electrolyte solution together with the gas are stored and sealed in a container provided with a flexible portion. In the actuator module, both ends of the organic actuator are fixed to the container, and only one end of the counter electrode is fixed to the container.

20 Claims, 11 Drawing Sheets

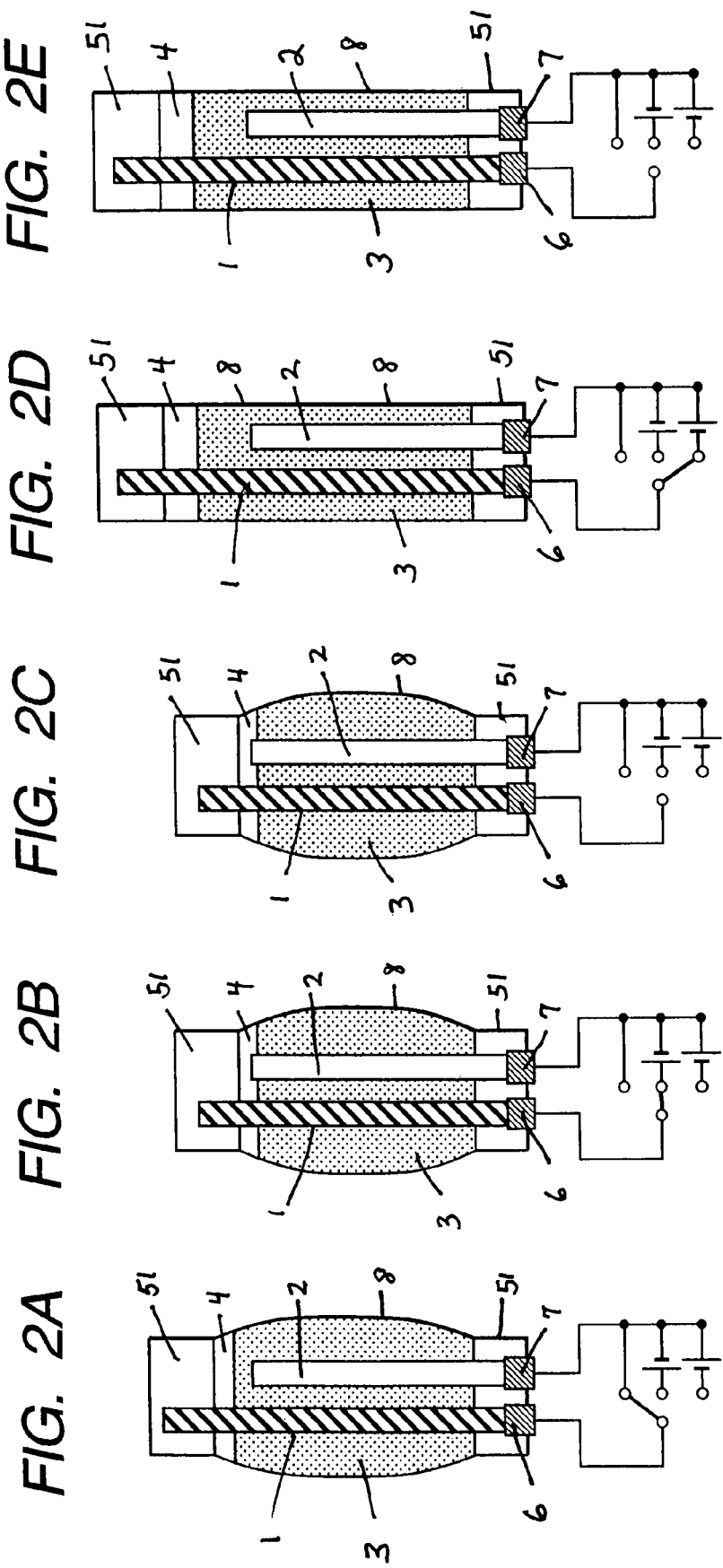

ACTUATOR MODULES

CLAIM OF PRIORITY

The present application claims priority from Japanese application JP 2005-127311 filed on Apr. 26, 2005, the content of which is hereby incorporated by reference into this application.

FIELD OF THE INVENTION

This invention relates to an actuator module, and more particularly to an actuator module structure using an organic material that makes a flexible motion of expanding and contracting in response to a voltage input.

BACKGROUND OF THE INVENTION

Medical and nursing-care fields have been demanding a safe actuator that is lightweight, flexible, and operable at a low driving voltage adapted for various devices, for example, the electric catheter, the fiber scope, the rehabilitation equipment, the powered suit, the artificial organ and the like. In addition to the above-described advantageous features, the actuator is required to realize a complex motion in a tiny space so as to be adapted for a paper display, a handy tactile device and the like which are expected to be further demanded in future. The actuator is expected to realize not only large stress, quick response, and highly accurate controllability, but also compactness, lightness, flexibility, quietness, and safe portability (low driving voltage type) as a soft actuator in future.

The actuator may be formed of a material that is flexibly deformable in response to an external signal. For example, a piezo actuator using a piezo effect of ferroelectrics, an SMA (shape-memory alloy) actuator using phase transition of the SMA may be well known as the actuator using the deformable material. The piezo actuator exhibits quick response and large stress, but low strain, high driving voltage and less flexibility. Meanwhile the SMA actuator exhibits a high strain, but slow response, low durability, and difficulty in execution of accurate control as the phase transition is performed to strain by changing the temperature through self heating by way of Joule heating. Both types of the actuators may have disadvantages as well as advantages.

Besides the generally employed strain type actuator as described above, the actuator formed of a soft material, that is, a lightweight and soft organic polymer has been employed (hereinafter referred to as an organic actuator). A conducting polymer actuator formed of conducting polymers, for example, polyaniline, polypyrrole and the like as disclosed in JP-A No. 20586/1990, an ionometric polymer-metal composites actuator formed of an ion exchange resin as disclosed in JP-A No. 6991/1994, and a conductive nano-particles composite actuator presented in the technical paper (entitled "Strain type ion conducting polymer actuator", Ishibashi et al., 53rd annual conference of Society of Polymer Science in 2004, IPA155) may be recognized as the organic actuators. Those actuators are featured by using a lightweight material, having quietness, and being operable at lower driving voltages in the order of several volts, which are soft and safe. The conducting polymer actuator and the conductive nano-particles composite actuator are of strain type like the natural muscle, which exhibit larger stress compared therewith. The conductive nano-particles composite actuator further exhibits excellent durability.

The organic actuator such as the conductive nano-particles composite actuator is basically structured to make a flexible motion upon a voltage input to a counter electrode provided only in an electrolyte solution. If the organic actuator is used in an environment other than the electrolyte solution, a motion made by an organic actuator film operable in the electrolyte solution has to be taken out of the electrolyte solution through the appropriate process.

SUMMARY OF THE INVENTION

It is an object of the invention to provide lightweight, compact and flexible organic actuator modules that can be stably operated in a gas such as air, and safely handled.

In the invention, an organic actuator film is sealed together with a counter electrode in a single container filled with an electrolyte solution to form an organic actuator module. The organic actuator module structured to seal the organic actuator film and the counter electrode in the container filled with the electrolyte solution is disclosed in JP-A No. 83389/2000. The disclosed organic actuator module is required to seal the organic actuator in the container filled with the electrolyte solution for preventing the electrolyte solution from leaking to the outside.

The organic actuator module according to the invention has a structure in which the organic actuator film, the counter electrode and the electrolyte solution are sealed together with the gas in the container having a flexible portion. The contained gas serves to maintain the inside of the container under the positive pressure. As the container is maintained under the positive pressure, a tension is applied to the flexible portion of the container. Accordingly the organic actuator film fixed to the container is constantly kept under the tension. The aforementioned effect is equivalent to the one realized by employing a counter spring mechanism that applies the tension to the organic actuator film. Even if the organic actuator is of the generally employed type for generating power only in the contracted state, the counter spring function of the organic actuator module of the invention may generate power even in the expanded state. In the invention, the use of the gas exhibiting lightness and instability makes it possible to realize the actuator module that is operated in the gas such as air (hereinafter simply referred to as gas) while keeping the organic actuator's features, for example, compactness, lightness and flexibility. The aforementioned process uses the gas like air without requiring additional parts, thus realizing a simple manufacturing while reducing the cost. As the gas having its volume changeable under the external pressure is sealed, the gas serving as a cushion may prevent the container from being broken under the unexpected external force applied to the flexible portion of the container.

The actuator module of the invention is structured to fix only one end of the counter electrode to the container such that the counter electrode does not act as the load to the actuator module when the flexible motion is made. This may prevent deformation of the counter electrode like bending. Therefore no burden is applied to the counter electrode.

The performance of the actuator module is hardly deteriorated owing to degradation of the counter electrode, thus allowing the stabilized use for an elongated period of time.

Embodiments of the invention are capable of providing the lightweight, compact and flexible organic actuator module which can be stably operated in the gas like air, and safely handled.

BRIEF DESCRIPTION OF THE DRAWINGS

FIG. 2A is a view schematically showing a state in which an actuator film voltage supply electrode 6 and the counter electrode voltage supply electrode 7 of the actuator module 10 of the first embodiment have the same electric potential.

FIG. 2B is a view schematically showing a state in which a voltage is input such that the actuator film voltage supply electrode 6 of the actuator module 10 of the first embodiment becomes positive.

FIG. 2C is a view schematically showing that the actuator film voltage supply electrode 6 and the counter electrode voltage supply electrode 7 of the actuator module 10 of the first embodiment are in an electrically opened state.

FIG. 2D is a view schematically showing a state in which a voltage is input such that the actuator film voltage supply electrode 6 of the actuator module 10 of the first embodiment becomes negative.

FIG. 2E is a view schematically showing that the actuator film voltage supply electrode 6 and the counter electrode voltage supply electrode 7 of the actuator module 10 of the first embodiment are in the electrically opened state.

DETAILED DESCRIPTION OF THE PREFERRED EMBODIMENTS

Figure 1A:
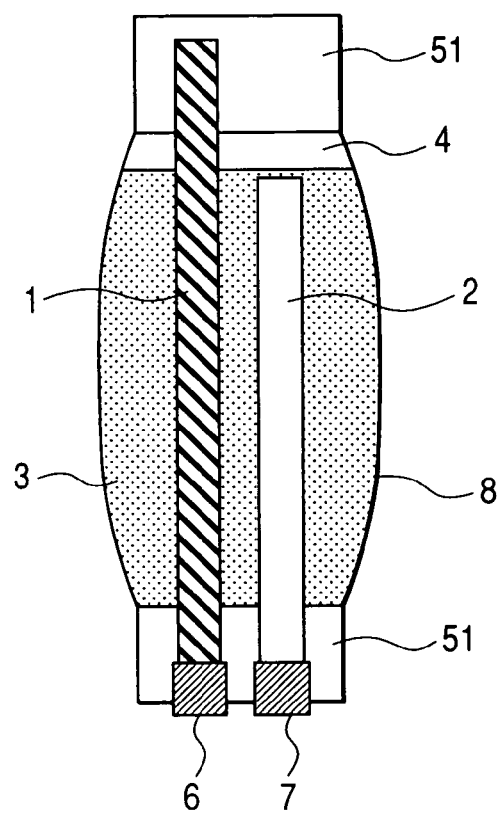
FIG. 1A is a sectional view schematically showing a structure of an actuator module 10 of a first embodiment.

Embodiments of the invention will be described referring to the drawings.

First Embodiment

A basic structure of the actuator module according to a first embodiment of the invention and a producing process thereof will be described hereinafter.

Figure 1B:
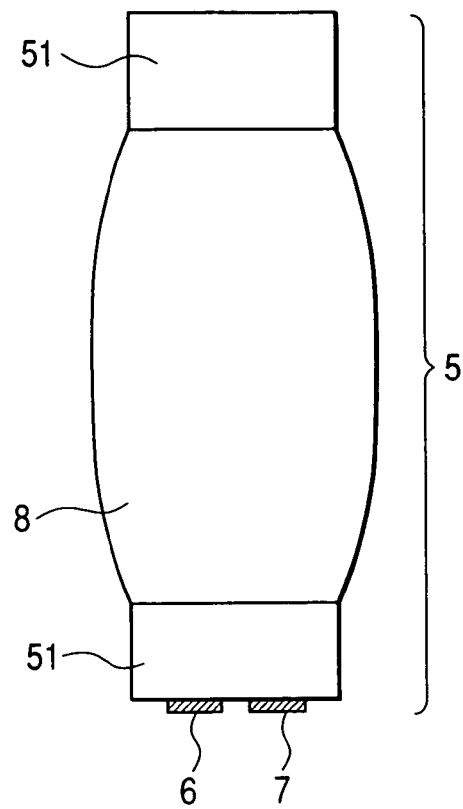
FIG. 1B is a schematic view showing an outer appearance of the actuator module 10 of the first embodiment.

The basic structure of the actuator module will be described referring to FIGS. 1A and 1B. FIG. 1A is a sectional view of an actuator module schematically showing an exemplary actuator module structure according to the embodiment of the invention. FIG. 1B is a schematic view showing an outer appearance of the actuator module according to the embodiment of the invention.

An actuator module 10 is formed of a container 5, an actuator film voltage supply electrode 6, and a counter electrode voltage supply electrode 7. The container 5 contains an actuator film 1, a counter electrode 2 provided to face the actuator film 1, an electrolyte solution 3 in which the actuator film 1 and the counter electrode 2 are immersed, a gas 4, a fixed portion 51 formed of a resin material and the like, and a flexible portion 8 formed of a rubber material and the like. The actuator film 1, the counter electrode 2, the electrolyte solution 3, the gas 4, the actuator film voltage supply electrode 6 and the counter electrode voltage supply electrode 7 are contained within the container 5, and sealed while maintaining the inside under a positive pressure.

One end of the actuator film 1 is bonded to one end of the actuator film voltage supply electrode 6. The other end of the actuator film voltage supply electrode 6, to which the actuator film 1 is not bonded is exposed out of the container 5 through the fixed portion 51 thereof. The actuator film voltage supply electrode 6 is fixed to the fixed portion 51 of the container 5. The other end of the actuator film 1, which is not bonded to the actuator film voltage supply electrode 6 is fixed to the fixed portion 51 of the container 5. That is, both ends of the actuator film 1 are fixed to the container 5. One end of the counter electrode voltage supply electrode 7 is bonded to one end of the counter electrode 2, and the other end of the counter electrode voltage supply electrode 7 is exposed out of the container through the fixed portion 51. Only one end of the counter electrode 2 is fixed to the fixed portion 51. Preferably the fixed portion 51 is formed of a hard material, for example, the resin, plastic, and metal. The material for forming the fixed portion 51 as shown in FIGS. 7A, 7B, 8A and 8B may be the same as those of this embodiment.

The gas 4 serves to keep the internal pressure of the container 5 at positive. Accordingly a flexible portion 8 is kept expanded when the voltage is not input between the electrodes. As the flexible portion 8 is provided to surround the actuator film 1 and the counter electrode 2, the force is applied to the container 5 for deforming the actuator film 1 in a strain direction. Both ends of the actuator film 1 are fixed to the respective fixed portions 51 of the container 5. That is, the tension from the container 5 is constantly applied to both ends of the actuator film 1. Meanwhile, as only one end of the counter electrode 2 is fixed to the fixed portion 51 of the container 5, the tension from the container 5 is not applied to the counter electrode 2. The flexible motion of the actuator film 1 is not interfered with the counter electrode 2, and may be transferred as the flexible motion of the actuator module 10. More specifically, the distance between both portions at the respective ends of the actuator module 10 for fixing the container varies.

The actuator film 1 is formed of or contains a material that makes a flexible motion upon an input of the voltage between the actuator film 1 and the counter electrode 2 in the electrolyte solution 3. Preferably the actuator film 1 is formed by binding the conductive minute particles with polymer molecules. When the DC voltage is input between the counter electrode and the above-described actuator material immersed in the electrolyte solution, the actuator material is expanded or contracted owing to an isotropic volume change in accordance with the voltage value. The amount of the flexible motion becomes large in proportion to the electrical charge accumulated in the material upon the voltage input. The higher the accumulated electrical charge becomes, the more the actuator film 1 expands. The accumulation of the electrical charge is equivalent to charging of an electric double layer capacitor that occurs on the material surface. In order to accumulate the electrical charge as much as possible, the electrical capacity of the electric double layer capacitor is required to be large. The capacity of the electric double layer capacitor is proportional to an area of the material in contact with the electrolyte, that is, the electrochemical surface area. Preferably, therefore, the material with large surface area is used for obtaining a greater flexible motion. The material formed by binding the conductive minute particles that exhibit characters of "large specific surface area", and "electrochemically inactive", for example, carbon minute particles with the material that exhibits characters that allow "the electrolyte to be moveable within the polymer molecules" and "the polymer chain to include a cross-linking point for easily restoring the original shape", for example, ion conductive polymer gel is regarded as being suitable for forming the actuator film 1.

In the first embodiment, the material formed by binding the carbon minute particle having its specific surface area of 1500 $m^2/g$, and a primary particle size of about 40 nanometers with an ion conductive polymer of perfluorosulfonic acid copolymer is used for forming the actuator film 1. More specifically, the film having its width of 5 mm, length of 20 mm, and thickness of 0.5 mm is used. Besides the material used in the first embodiment, the material used in the first embodiment may be mixed with the carbon fiber, carbon nano-tube and the like for the purpose of increasing the electric conductivity. The material that contains no binder, for example, a graphite sheet may be employed so long as the specific area is large. The conductive polymer, for example, polypyrrole, and polyaniline may be employed for forming the actuator film 1.

The counter electrode 2 is formed of a material that hardly causes an electrochemical reaction with the electrolyte solution 3 (wide potential window) and the electrolysis thereof irrespective of the voltage input between the counter electrode 2 and the actuator film 1 within the electrolyte solution 3. Likewise the material for forming the actuator film 1, the counter electrode 2 is preferably formed of the material made by binding the carbon minute particle having the large specific surface area with the material that allows the electrolyte to be moved within the polymer, for example, ion conductive polymer. The use of the above-described material prevents the electrochemical reaction with the electrolyte solution 3 irrespective of the voltage input, resulting in a stabilized operation. The use of the material allows a high voltage to be input with wide potential window, thus providing a great strain. In the first embodiment, like the actuator film 1, the material formed by binding the carbon minute particle having its specific surface area of about 1500 $m^2/g$, and the primary particle size of about 40 nanometers with the ion conductive polymer of the perfluorosulfonic acid copolymer is used for forming the counter electrode 2. Besides the material used in the first embodiment, the rare metal such as platinum, and conductive carbon materials such as the graphite, and doped conductive diamond may be used.

Preferably the electrolyte solution 3 has safety and high electric conductivity like sodium chloride aqueous solution at a high concentration. In the first embodiment, the sodium chloride aqueous solution at the concentration of one normal (1N) is employed as the electrolyte solution. Besides the electrolyte solution employed in the first embodiment, aqueous solution of halogenoid alkali metal such as lithium chloride, and aqueous solution of perchlorate salt, fluoborate salt, fluorophosphate salt, bromide salt, hydroxide salt, acetate, sulfate salt, nitrate salt, and borate salt may be employed as the electrolyte solution. Besides the metal, molecular cation such as alkyl ammonium salt may be employed. Further nonaqueous solution of propylene carbonate of tetraethylammonium tetrafluoborate and tetraethylammonium hexafluorophosphate, and solution of gamma-butyrolactone may be employed.

The gas 4 serves to increase the internal pressure of the container 5 to deform the flexible portion 8 thereof. This may not only apply the tension to the actuator film 1 having both ends fixed to the fixed portions 51 of the container 5 but also perform the cushioning function to prevent the container 5 from being broken by coping with the external force unexpectedly applied to the flexible portion 8 of the container 5. Preferably safe and yet inexpensive gas is employed as the gas 4. Besides the safe and inexpensive gas employed in the first embodiment, inactive gas such as argon gas, inexpensive and stable gas, for example, nitrogen gas and carbon dioxide gas, and mixture thereof may be used as the gas 4. In the case where the internal pressure is at the insufficient level, the electrolyte solution is subjected to electrolysis for generating a small amount of gas such that the internal pressure is adjusted.

Preferably the fixed portion 51 of the container 5 is formed of a lightweight material with high insulation property. The flexible portion 8 is required to be formed of an elastic material such as an elastomer, which is inactive against the electrolyte solution. In the first embodiment, the flexible portion 8 is formed of a silicon rubber material, and the fixed portion 51 is formed of an acrylate resin. Besides the silicon rubber material employed in the first embodiment, natural rubber, synthetic rubber, and an elastomer material, for example, a polyurethane resin with low elastic modulus may be used for forming the flexible portion 8. The other polymer material except the one used in the first embodiment may be employed for forming the fixed portion 51 in the first embodiment.

Flexible motions of the actuator module 10 and characteristics of the actuator will be described hereinafter.

The flexible motions of the actuator module 10 will be described referring to FIGS. 2A to 2E. The actuator module 10 of the first embodiment is operated by externally inputting the voltage between the actuator film voltage supply electrode 6 and the counter electrode voltage supply electrode 7 which are exposed to the outside from the container 5. FIGS. 2A to 2E show the respective flexible motions of the actuator module 10 upon the external voltage input. FIG. 2A represents that the actuator film voltage supply electrode 6 and the counter electrode voltage supply electrode 7 are at the equivalent potentials. FIG. 2B represents the state that has been changed from the state shown in FIG. 2A. That is, upon the voltage input such that the potential of the actuator film voltage supply electrode 6 becomes positive, the actuator film 1 contracts to deform the flexible portion 8 of the container 5, and then the actuator module 10 contracts in the longitudinal direction. FIG. 2C represents the state where the actuator film 1 and the counter electrode 2 are electrically opened in the aforementioned state shown in FIG. 2B. In this case, the configuration of the actuator module is substantially kept as it is because of conservation of charge accumulated in the actuator film 1. Referring to FIG. 2D, when the voltage is input such that the potential of the actuator film voltage supply electrode 6 becomes negative, the actuator film 1 expands. If the tension is not applied to the actuator film 1 from the container 5, the actuator film 1 is deformed, for example, bent, but the actuator module 10 itself is free from deformation. When the voltage is further input such that the actuator film voltage supply electrode 6 becomes positive, the actuator module 10 contracts as shown in FIG. 2B. When the potential of the actuator film voltage supply electrode 6 is made equivalent to that of the counter electrode voltage supply electrode 7, the configuration of the actuator module 10 is restored to the one before the voltage input. When the power supply is opened, the configuration of the actuator module 10 is maintained as it is as shown in FIG. 2E.

Figure 3:
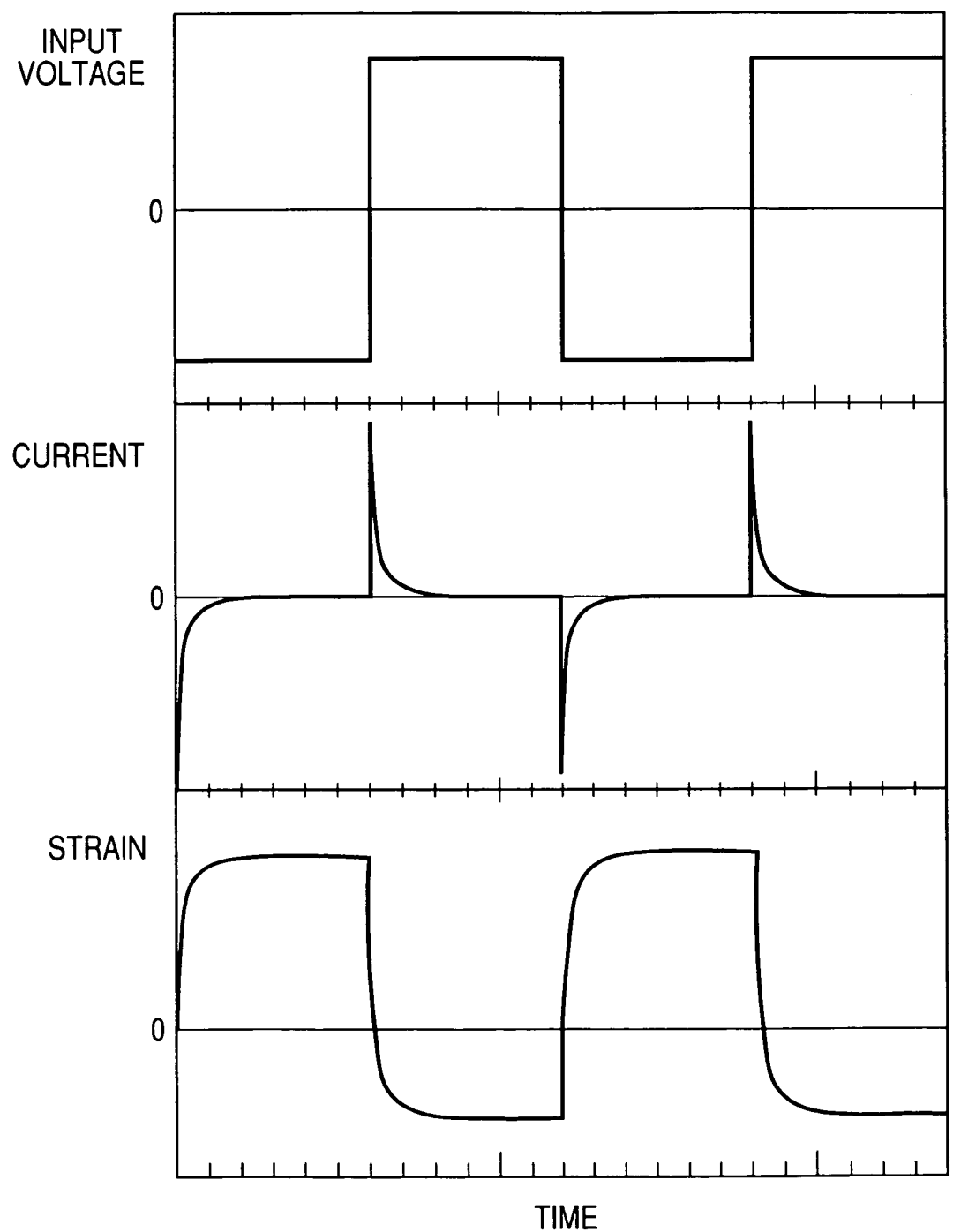
FIG. 3 is a graphical representation that shows a correlation among the voltage input between the actuator film voltage supply electrode 6 and the counter electrode voltage supply electrode 7, a current applied to the actuator film 1, and the strain of the actuator module 10 of the first embodiment upon operation thereof.

FIG. 3 is a graphical representation that shows a correlation among the input voltage between the actuator film voltage supply electrode 6 and the counter electrode voltage supply electrode 7, the current applied to the actuator film 1, and the strain of the actuator module 10 in the operation thereof according to the first embodiment. When the input voltage value is changed to deform the actuator module 10, the current is momentarily flowed in the actuator film. In other words, the current is hardly applied for maintaining the configuration that has been varied. Accordingly, the actuator module 10 has a feature that hardly consumes electric power for maintaining the configuration of the actuator module 10 that has been varied. The actuator module of the first embodiment is capable of making the flexible motions of expansion and contraction at maximum strain of 3% at the input voltage of +/−2.5 volt.

The description with respect to a capability of the actuator module 10 for power generation will be explained hereinafter.

The level of capability of the actuator module 10 for power generation in an expanded state is different from that of the actuator module 10 in a contracted state. Upon expansion, the power generated by the actuator module 10 is substantially determined in accordance with the tension applied to the actuator film 1 from the container 5. Upon contraction, it is determined in accordance with a balance between the capability of the actuator film 1 for power generation and the tension applied to the actuator film 1 from the container 5. The upper limit of the capability of the actuator film 1 for power generation is determined by the maximum value of the generated stress that is intrinsic to the material that forms the actuator film 1. The stress generated by the actuator film 1 in the first embodiment is 3 mega pascal that is 10 times higher than that generated by the natural muscle. The tension applied to the actuator film 1 from the container 5 may be adjusted by controlling the elastic constant of the flexible portion 8 and an amount of the gas 4. Upon contraction, the actuator module 10 of the first embodiment is allowed to lift the load of 1 kg at maximum.

The description with respect to a response of the actuator module 10 will be explained.

Figure 4A:
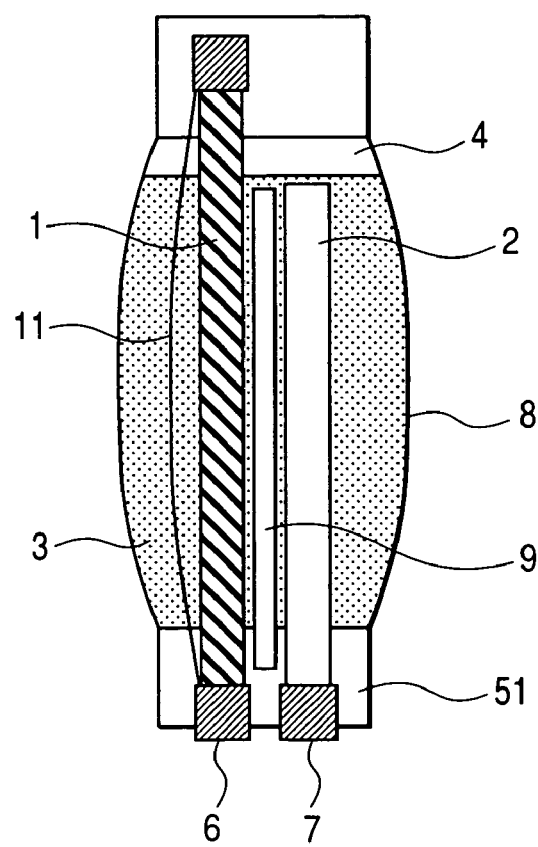
FIG. 4A is a sectional view of the actuator module 10 of the first embodiment in the state where a separator 9 is provided between the actuator film 1 and the counter electrode 2, and both ends of the actuator film 1 are short-circuited with a coated conductive wire 11.

The actuator module 10 of the first embodiment is activated to make a flexible motion of expanding or contracting in compliance with the input voltage at frequency of 30 Hz, for example. Generally the response of the actuator module 10 depends mainly on the speed of the flexible motion made by the actuator film 1. The flexible motion of the actuator film 1 depends on the electric charge that is charged in or discharged from the actuator film 1. Accordingly the speed of the flexible motion depends on the time for charging/discharging. For the purpose of reducing the charging/discharging time, that is, accelerating the flexible motion, the value derived from multiplying a capacitance C of the actuator film 1 by the internal resistance R of the actuator module 10, that is, RC has to be made small. As the decrease in the capacitance C of the actuator film 1 may reduce the strain, the capacitance cannot be set to a small value. The internal resistance R of the actuator module 10 then has to be decreased. There are two types of internal resistance of the actuator module 10, that is, the electric resistance of the electrolyte solution 3 between the actuator film 1 and the counter electrode 2, and the electric resistance of the actuator film 1 and the counter electrode 2. In order to reduce the electric resistance of the electrolyte solution 3 between the actuator film 1 and the counter electrode 2, the concentration of the electrolyte solution 3 is required to be increased and the distance between the actuator film 1 and the counter electrode 2 is required to be reduced as small as possible. In the first embodiment, the sodium chloride aqueous solution at the concentration of one normal (1N) is employed as the electrolyte solution 3, and the actuator film 1 and the counter electrode 2 are disposed such that the distance therebetween is reduced for the purpose of decreasing the electric resistance of the electrolyte solution 3 between the actuator film 1 and the counter electrode 2. In this case, a thin separator 9 may be provided between the actuator film 1 and the counter electrode 2 so as not to be in contact with each other as shown in FIG. 4A. In the first embodiment, the material with high content (40%) of carbon minute particles exhibiting high electric conductivity is employed so as to decrease the electric resistance of the actuator film 1 and the counter electrode 2.

Figure 4B:
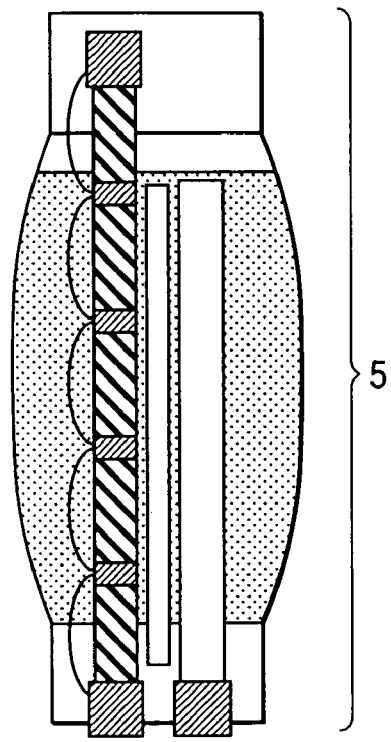
FIG. 4B is a sectional view of the actuator module 10 of the first embodiment in the state where the separator 9 is provided between the actuator film 1 and the counter electrode 2, and the center portion of the actuator film 1 is provided with a plurality of electrodes so as to be short-circuited with the coated conductive wire 11.

Both ends of the actuator film 1 may be short-circuited with a coated conductive wire 11 so as to avoid a potential drop caused by the electric resistance of the actuator film 1 as shown in FIG. 4A. The coated conductive wire 11 is required to have a length longer than that of the actuator film 1 in the expanded state, and to be coated so as to prevent the electrochemical reaction with the electrolyte solution 3. In the case where the actuator film 1 is long, not only both ends of the actuator film 1 but also the center thereof may be provided with a plurality of electrodes for the purpose of avoiding the potential drop as shown in FIG. 4B. If the counter electrode 2 is provided with the coated conductive wire as well (not shown), the potential drop in the counter electrode 2 may further be effectively suppressed.

Figure 5A:
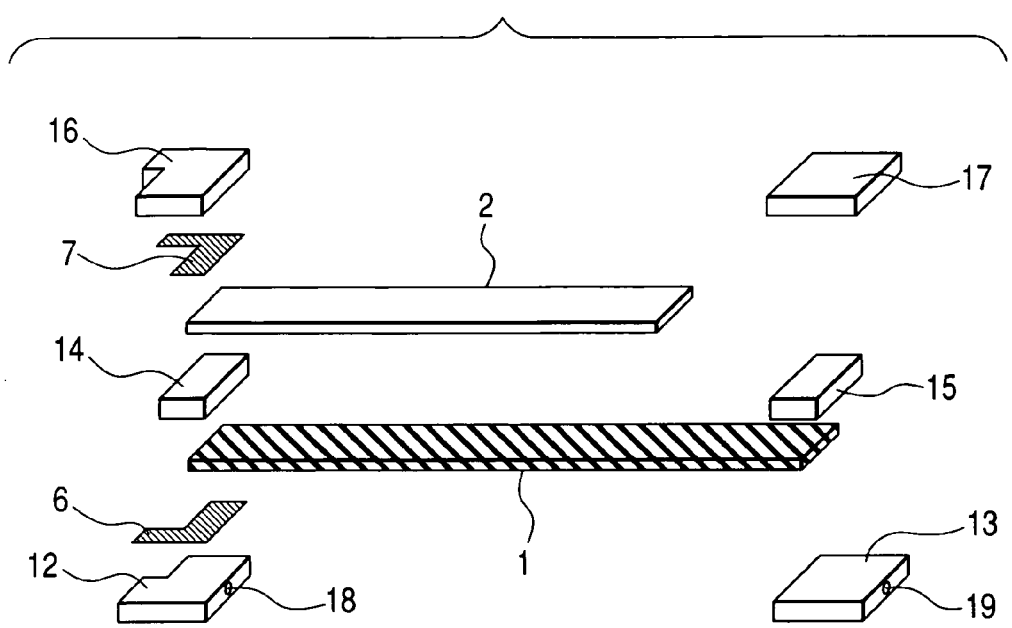
FIG. 5A is a view showing a process of producing the actuator module of the first embodiment by sequentially laminating and bonding acrylic pieces 12, 13 as parts of the fixed portion 51, the actuator film voltage supply electrode 6, the actuator film 1, acrylic pieces 14, 15 as parts of the fixed portion 51, the counter electrode 2, the counter electrode voltage supply electrode 7, and acrylic pieces 16, 17 as parts of the fixed portion 51.
Figure 5B:
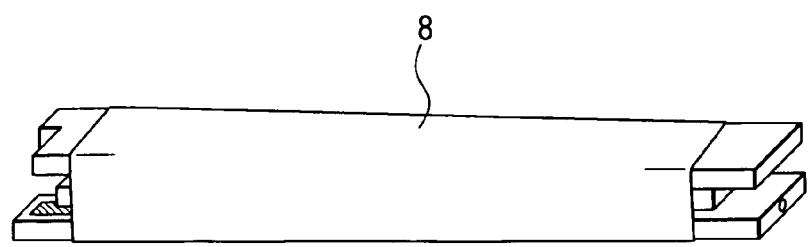
FIG. 5B is a view showing a process of producing the actuator module of the first embodiment, in which the assembly produced as shown in FIG. 5A is surrounded by a thin silicone rubber tube as an elastic portion 8.
Figure 5C:
FIG. 5C is a view showing a process of producing the actuator module of the first embodiment, in which the gas 4 is charged through a fine pore 18.

The description with respect to the process of producing the actuator module 10 in the first embodiment will be explained hereinafter. FIGS. 5A to 5C schematically represent the process of producing the actuator module 10 in the first embodiment of the invention.

Referring to FIG. 5A, the actuator module 10 is formed by laminating and bonding such portions as acrylic pieces 12, 13 as parts of the fixed portion 51, the actuator film voltage supply electrode 6, the actuator film 1, acrylic pieces 14, 15 as parts of the fixed portion 51, the counter electrode 2, the counter electrode voltage supply electrode 7, and acrylic pieces 16, 17 as parts of the fixed portion 51, sequentially. The acrylic pieces 12 and 13 have fine pores 18, 19, respectively so as to admit an inflow of the electrolyte solution 3 and the gas 4. The actuator film 1 and the counter electrode 2 are formed by casting the ion conductive polymer fluid dispersion mixed with the carbon minute particles onto a substrate so as to be dried thereon. The film produced on the substrate is peeled off from the substrate and formed into an arbitrary size. Referring to FIG. 5B, the combined body formed as shown in FIG. 5A is surrounded by a thin silicon rubber tube as the flexible portion 8 of the container 5 through bonding at the acrylic pieces 12, 13, 14, 15, 16, and 17, respectively. The electrolyte solution 3 is charged through the fine pore 18 formed in the acrylic piece 12, and then sealed at the fine pore 19 formed in the acrylic piece 13. Then the gas 4 is supplied through the fine pore 18 until the internal pressure becomes the value at which the tension is applied to the actuator film 1 as shown in FIG. 5C. The actuator module 10 is finally produced by sealing the fine pore 18.

Second Embodiment

Another form of the actuator module according to the invention will be described as a second embodiment.

Figure 6A:
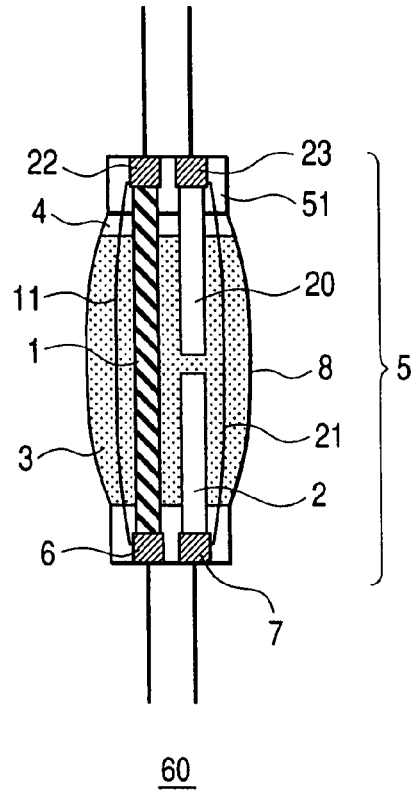
FIG. 6A is a sectional view of an actuator module unit 60 of a second embodiment, schematically showing a state where the actuator film voltage supply electrodes 6, 22, and the counter electrode voltage supply electrodes 7, 23 are exposed to the outside from the container 5.
Figure 6B:
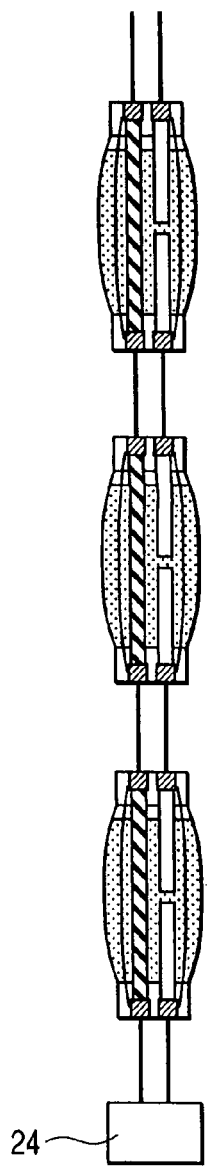
FIG. 6B is a view schematically showing the actuator module formed by connecting the actuator module units shown in FIG. 6A in series.
Figure 6C:
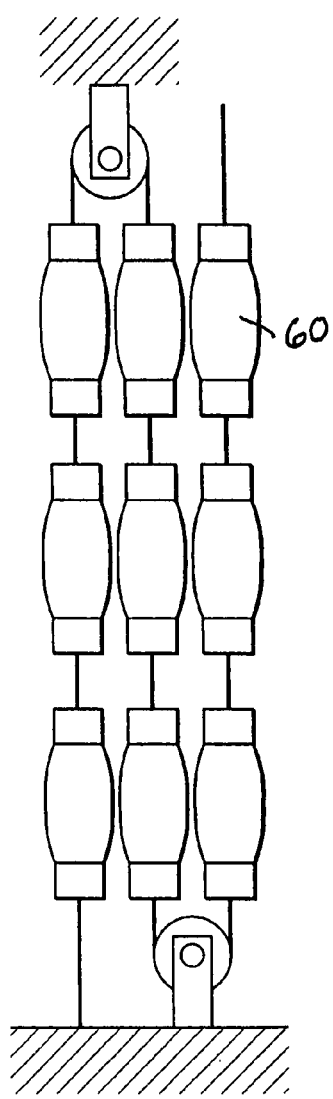
FIG. 6C is a view schematically showing that the actuator module shown in FIG. 6B is reeled.

Each of FIGS. 6A to 6C schematically shows an exemplary structure of an actuator module according to the invention. FIG. 6A is a sectional view of the actuator module unit. FIG. 6B is a view that represents a state where the actuator units are connected in series. FIG. 6C is a view that represents a state where the actuator units connected in series are reeled. An actuator module unit 60 is formed of a container 5, actuator film voltage supply electrodes 6 and 22, counter electrode voltage supply electrodes 7 and 23, and coated conductive wires 11 and 21. The container 5 includes an actuator film 1, counter electrodes 2, 20, an electrolyte solution 3, a gas 4, a fixed portion 51 formed of a resin material, and a flexible portion 8 formed of a rubber material. The container 5 houses the actuator film 1, the counter electrodes 2, 20, the electrolyte solution 3, the gas 4, the actuator film voltage supply electrodes 6, 22, the counter electrode voltage supply electrodes 7, 23, and the coated conductive wires 11, 21, all of which are sealed while being maintained under the positive pressure.

The flexible portion 8 of the container 5 is provided to surround the actuator film 1 in a longitudinal direction thereof. Both ends of the actuator film 1 are fixed to the fixed portions 51 of the container 5. The ends of the actuator film 1 are bonded to each one end of the actuator film voltage supply electrodes 6 and 22, respectively. The actuator film voltage supply electrodes 6 and 22 are embedded in each wall surface of the fixed portions 51 of the container 5 so as to be fixed therein. The other ends to which the actuator film is not connected are exposed to the outside. Both ends of the actuator film 1 are electrically short-circuited with the coated conductive wire 11. The counter electrode 2 that faces the actuator film 1 has one end bonded to one end of the counter electrode voltage supply electrode 7. The other end of the counter electrode voltage supply electrode 7 to which the counter electrode 2 is not bonded is exposed to the outside of the container through the fixed portion 51 of the container 5. The counter electrode voltage supply electrode 7 to which the counter electrode 2 is bonded is fixed to the fixed portion 51 of the container 5. That is, the counter electrode 2 is fixed to the container 5 at one end only. Likewise the counter electrode 2, the counter electrode 20 is provided to face the actuator film 1, and has one end connected to one end of the counter electrode voltage supply electrode 23 so as to be fixed to the fixed portion 51 of the container 5. Likewise the counter electrode voltage supply electrode 7, the counter electrode voltage supply electrode 23 has the other end embedded in the wall surface of the fixed portion 51 of the container 5, and partially exposed to the outside.

As the internal pressure of the container 5 is maintained to be positive, the flexible portion 8 is in an expanded state. As the flexible portion 8 is provided to surround the actuator film 1 and the counter electrode 2, the force for deforming the actuator film 1 in the strain direction is applied to the container 5. Both ends of the actuator film 1 are fixed to the fixed portion 51 of the container 5. Accordingly the tension from the container 5 is constantly applied to the actuator film. Meanwhile each one end of the counter electrodes 2 and 20 are only fixed to the fixed portion 51 of the container 5. The tension from the container 5 is not applied to the counter electrodes 2 and 20. The flexible motion of the actuator film 1 may be transferred as that of the actuator module 10 without being interfered with the counter electrodes 2 and 20.

Like the actuator module 10 as described in the first embodiment referring to FIGS. 1A and 1B, the voltage is required to be externally input between the actuator film voltage supply electrode 6 and the counter electrode voltage supply electrode 7 for allowing the flexible motion of the actuator module unit 60 as shown in FIG. 6A.

Paired electrodes respectively connected to the actuator film and the counter electrode are exposed at both ends of the actuator module unit 60 as shown in FIG. 6A. A plurality of the actuator module units 60 may be connected in series, which serve as an actuator as shown in FIG. 6B. In this case, a power supply 24 is connected only to the actuator module unit at the end adjacent thereto so as to operate all the actuator module units. Assuming that the whole length of the actuator module unit 60 is 2 cm, the maximum stroke may be 0.6 mm as its strain is 3% at maximum. If ten actuator module units 60 are connected in series, the resultant stroke will be 6 mm at maximum. If those actuator module units 60 are reeled as shown in FIG. 6C, the stroke may further be increased in the reduced space. As the drawings that show the electric wire among the electrodes are simplified, the power supply 24 is not shown.

The actuator module units 60 are connected in series as shown in FIGS. 6A to 6C so as to provide the actuator module at an arbitrary stroke.

Figure 7A:
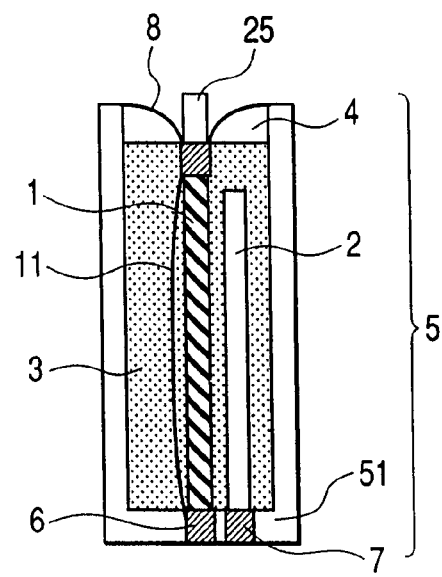
FIG. 7A is a sectional view of an actuator module unit 70 in which the flexible portion 8 is formed on the surface to which one end of the actuator film 1 of the second embodiment is fixed.
Figure 7B:
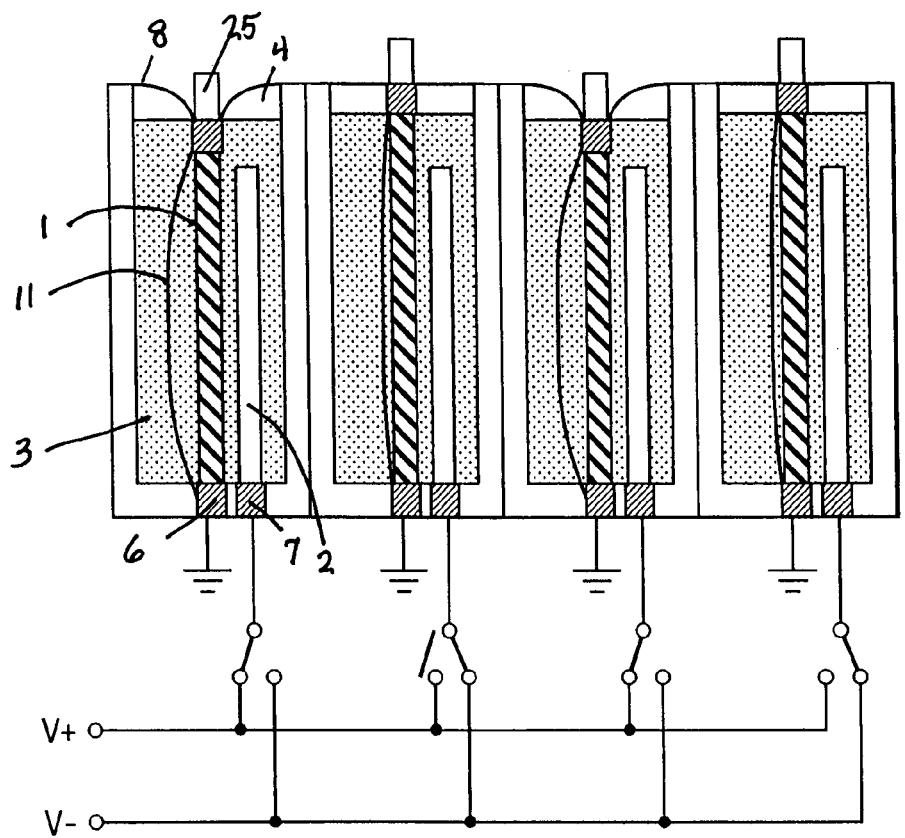
FIG. 7B is a sectional view of an actuator matrix formed of the actuator module units, as shown in FIG. 7A, arranged in parallel.

FIGS. 7A and 7B schematically show another form of the structure of the actuator module according to the invention. FIG. 7A is a sectional view of the actuator module unit. FIG. 7B is a sectional view of an actuator matrix using the actuator module units. The structure of an actuator module unit 70 is the same as that of the actuator module of the first embodiment as shown in FIGS. 1A, 1B, 4A, and 4B. In the actuator module unit 70 shown in FIG. 7A, the actuator film 1 has one end bonded to the flexible portion 8 of the container 5. The flexible motion of the actuator film 1 may be transferred as that of the flexible portion 8. If a pin 25 is connected to the flexible portion 8, the flexible motion of the actuator film 1 caused by the input voltage to the actuator module unit 70 may be output as the vertical movement of the pin 25.

The actuator module unit 70 shown in FIG. 7A is characterized as follows. An upper portion of the container 5 is formed as a moveable portion as the flexible portion 8 and the pin 25. A plurality of the actuator module units 70 may be arranged as shown in FIG. 7B and connected by bonding the connected wall surfaces of the adjacent units. This makes it possible to easily form the actuator matrix. For example, the pins 25 may be provided to be two-dimensionally arranged. Referring to FIG. 7B, a switch may be provided to each of the actuator module units of the actuator matrix such that the pin of the arbitrary actuator module unit may be moved under the control using the positive and negative power supply units. As shown in FIG. 7B, pins 25 are alternately arranged such that a height of one of the pins 25 is different from that of the adjacent pin 25 by inputting the positive and negative voltages to the corresponding actuator module units. It is possible to replace the switch with the electronic element, or to use a bridge method for executing the control with the single polarity power supply.

Figure 8A:
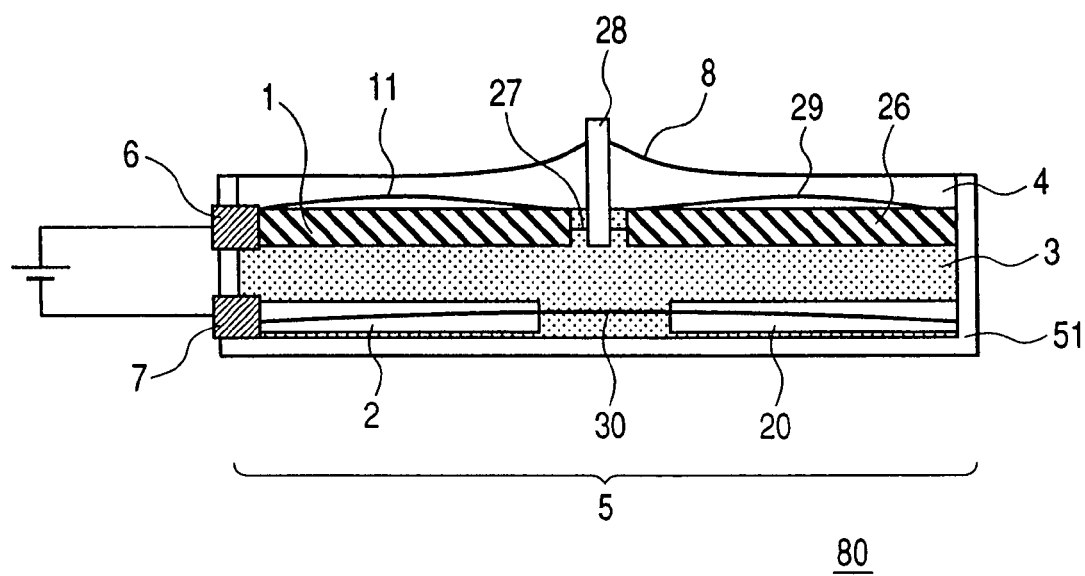
FIG. 8A is a sectional view of an actuator module unit 80 of a V-type structure according to the second embodiment, schematically showing the state in which the positive voltage is input to the actuator film.
Figure 8B:
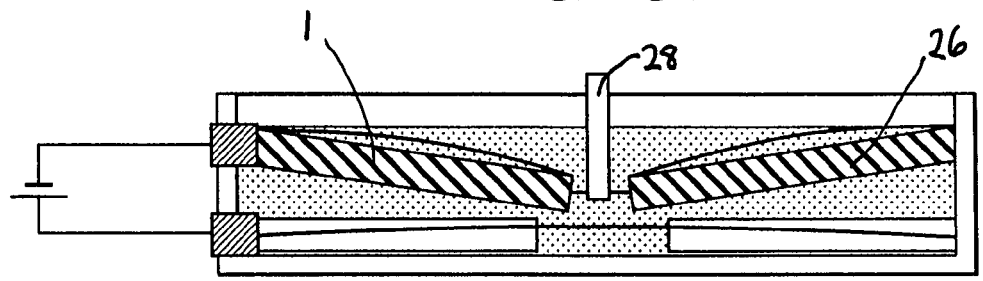
FIG. 8B is a sectional view of the actuator module unit 80 having the V-type structure according to the second embodiment, schematically showing the state in which the negative voltage is input to the actuator film.

Each of FIGS. 8A and 8B schematically shows another form of a structure of the actuator module of the embodiment according to the invention. A V-type structure may be employed as one of the method for expanding the motion of the actuator of strain type with low strain. More specifically in the V-type structure, both ends of the strain type actuator are fixed, and the load is applied to the center of the actuator film in the direction vertical thereto. The ends of the actuator are fixed to the container in a straight line in the state where the strain type actuator is contracted. The resultant sag of the center of the actuator upon expansion of the actuator in the aforementioned state is output as the stroke in the direction vertical to the actuator film at the load on the center portion. In this case, when the strain is small, the resultant stroke is far larger than that obtained upon the flexible motion of the actuator derived from releasing the ends of the actuator. The actuator module unit shown in FIGS. 8A and 8B is characterized by taking the high stroke using the above-described structure.

Each of FIGS. 8A and 8B schematically represents the cross section of an actuator module unit using the V-type structure. FIG. 8A schematically shows the state in which the actuator film is contracted by inputting the positive voltage to the actuator module unit to move the pin up. FIG. 8B schematically shows the state in which the actuator film is expanded by inputting the negative voltage to the actuator module unit to move the pin down. An actuator module unit 80 is formed of the container 5, the actuator film voltage supply electrode 6, the counter electrode voltage supply electrode 7, the coated conductive wires 11, 27, 29, 30, and the pin 28. The container 5 includes the actuator films 1, 26, the counter electrodes 2, 20, the electrolyte solution 3, the gas 4, the fixed portion 51 formed of the resin material, and the flexible portion 8 formed of the rubber material. The actuator films 1, 26, the counter electrodes 2, 20, the electrolyte solution 3, the gas 4, the actuator film voltage supply electrode 6, the counter electrode voltage supply electrode 7, the coated conductive wires 11, 27, 29, 30, and the pin 28 are contained and sealed within the container 5.

The flexible portion 8 of the container 5 is formed at an upper portion of the container 5. One end of the actuator film 1 is connected to one end of the actuator film 26 via the coated conductive wire 27, which are electrically short-circuited. The other end of the actuator film 1 is connected to one end of the actuator film voltage supply electrode 6. The other end of the actuator film 26 is fixed to the fixed portion 51 of the container 5. The actuator film voltage supply electrode 6 is fixed to the container 5 by having one end partially embedded in the wall surface of the fixed portion 51 of the container 5. The other end of the actuator film voltage supply electrode 6, to which the actuator film is not connected is exposed to the outside. The total length of the actuator films 1, 26 and the coated conductive wire 27 is adjusted such that they are kept straight without having the sag within the container 5 when the actuator films 1 and 26 are contracted. Both ends of the actuator film 1 are connected to the coated conductive wire 11, which are electrically short-circuited. Both ends of the actuator film 26 are also connected to the coated conductive wire 29, which are electrically short-circuited.

The counter electrode 2 provided to face the actuator film 1 has one end connected to one end of the counter electrode voltage supply electrode 7. Likewise the actuator film voltage supply electrode 6, the other end of the counter electrode voltage supply electrode 7 is embedded in the wall surface of the fixed portion 51 of the container 5, which is fixed thereto and exposed to the outside. The counter electrode 20 provided to face the actuator film 26 has one end fixed to the fixed portion 51 of the container 5. The counter electrodes 2 and 20 are connected through the coated conductive wire 30, which are electrically short-circuited.

The pin 28 has its lower portion bonded to the center of the coated conductive wire 27, and its upper portion bonded to the flexible portion 8 of the container 5. The pin 28 serves to transfer the downward force applied from the flexible portion 8 to the actuator films 1, 26 through the coated conductive wire 27 as the tension. The length of the pin 28 is adjusted so as to apply the tension to the actuator films 1, 26 in the expanded states.

When the positive voltage is input between the actuator film voltage supply electrode 6 and the counter electrode voltage supply electrode 7 both exposed on the surface of the container 5, the actuator films 1 and 26 are contracted to move the pin 28 up as shown in FIG. 8A. Meanwhile when the negative voltage is input, the actuator films 1, 26 are expanded to move the pin 28 down as shown in FIG. 8B. In the case where the actuator films 1 and 26 each having its length of 1 cm are used in the actuator module unit as shown in FIGS. 8A and 8B, the pin 28 may be vertically moved by 2 mm at a maximum.

In the embodiment, two actuator films 1 and 26 are employed. The actuator module unit according to the embodiment may be structured to employ three or more actuator films. The actuator module unit may be structured to use three actuator films by providing a pin at one of two joint portions of the actuator films.

The actuator module unit shown in FIGS. 8A and 8B is capable of providing not only greater strokes but also the actuator matrix easily by bonding the adjacent wall surfaces as the upper portion of the container 5 at which the flexible portion 8 and the pin 28 are provided is moveable likewise the actuator module unit 70 as described referring to FIGS. 7A and 7B. The actuator matrix formed of the actuator module units shown in FIGS. 8A and 8B has advantageous features of great stroke and reduced thickness.

Figure 9A:
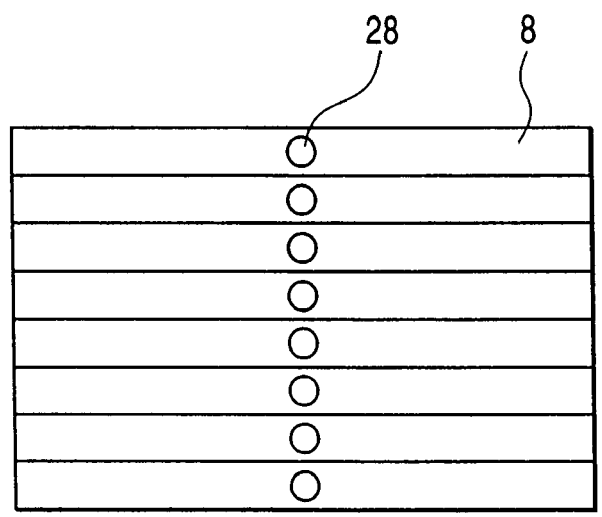
FIG. 9A is a top view of a one-dimensional actuator matrix using the actuator module units shown in FIGS. 8A and 8B.
Figure 9B:
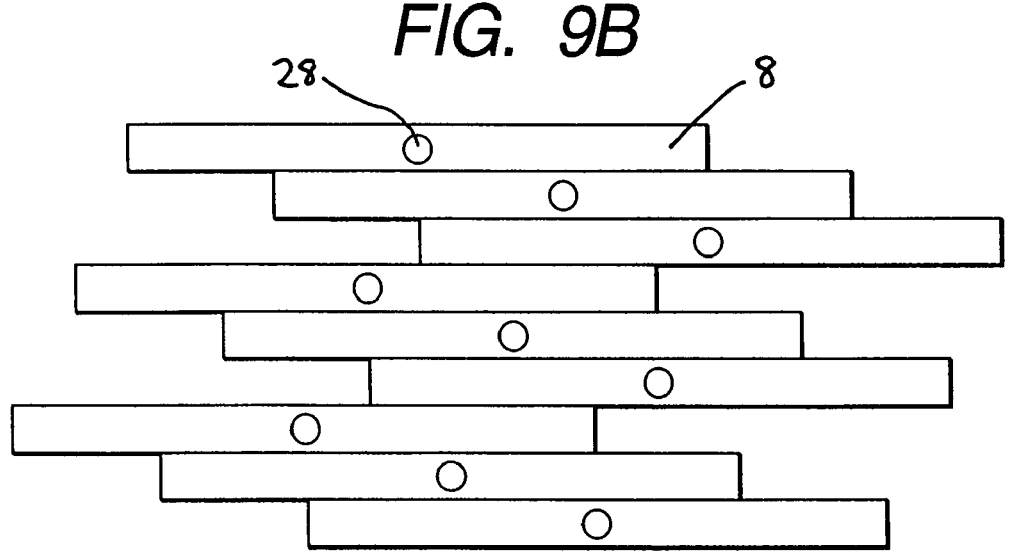
FIG. 9B is a top view of a two-dimensional actuator matrix using the actuator module units shown in FIGS. 8A and 8B.

Each of FIGS. 9A and 9B schematically shows the actuator matrix using the actuator module units shown in FIGS. 8A and 8B. FIG. 9A is a top view of a one-dimensional actuator matrix using the actuator module units. FIG. 9B is a top view of a two-dimensional actuator matrix using the actuator module units.

In the case where the actuator matrix is produced using the actuator module units as shown in FIGS. 8A and 8B, the actuator matrix shown in FIG. 9A has the simplest structure. It is structured by arranging each longitudinal surface of the containers 5 in parallel having each flexible portion 8 of the actuator module unit 80 facing upward such that the pins 28 are arranged in line. The respective surfaces of the containers 5 each having the flexible portion 8 of the actuator module unit 80 facing upward are arranged in parallel such that each surface is displaced with one another as the two-dimensional actuator matrix shown in FIG. 9B.

Third Embodiment

A braille device as one of the handy tactile device, which is an applied example using the actuator module according to a third embodiment of the invention will be explained hereinafter. The braille has a 3×2 dot matrix at a pitch of about 2.2 mm and a height of about 0.4 mm as a single unit. The braille device of the embodiment includes six pin matrices arranged in 3×2 such that an arbitrary pin may be vertically moved at a stroke of 0.4 mm in response to an electric signal.

The braille device that has the simplest structure using the actuator module of the invention may be the actuator matrix using the actuator module units 70 as described in the second embodiment referring to FIGS. 7A and 7B. In the second embodiment referring to FIG. 7B, the actuator module units 70 are arranged one-dimensionally. However, they may be arranged 3×2.

Figure 10:
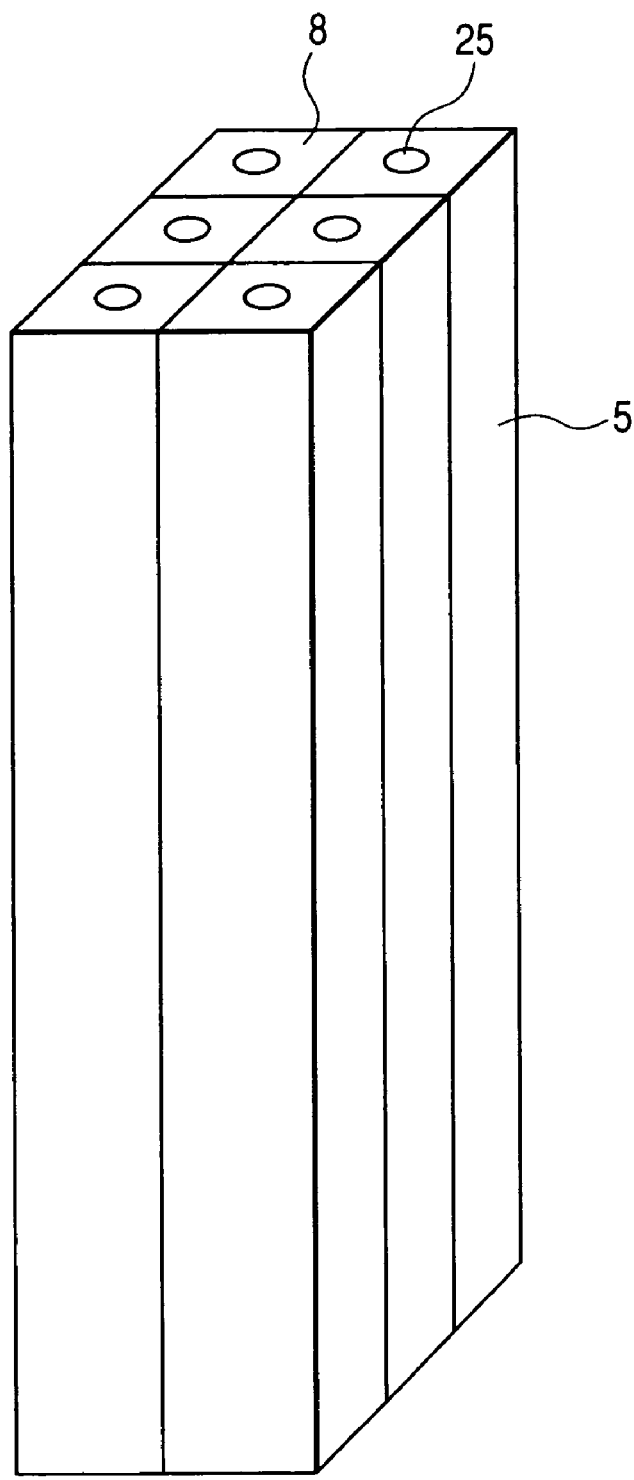
FIG. 10 is a perspective view of a braille device 100 formed by arranging the actuator module units 70 shown in FIGS. 7A and 7B into a 3×2 structure.

FIG. 10 is a perspective view representing a braille device 100 having the actuator module units 70 arranged 3×2. The actuator module unit 70 is structured in accordance with conditions as described below so as to satisfy the specification of the braille.
(1) The cross section seen from the top of the actuator module unit 70 is sized to 2.2 mm×2.2 mm for the purpose of setting the pitch of each pin to about 2.2 mm.
(2) As the pin is required to be vertically moved by 0.4 mm, the length of the actuator film 1 is set to the value equal to or longer than approximately 15 mm.

The thus structured actuator module units 70 are arranged 3×2 and fixed such that the braille device displays the braille upon the voltage input to the arbitrary actuator module.

Figure 11:
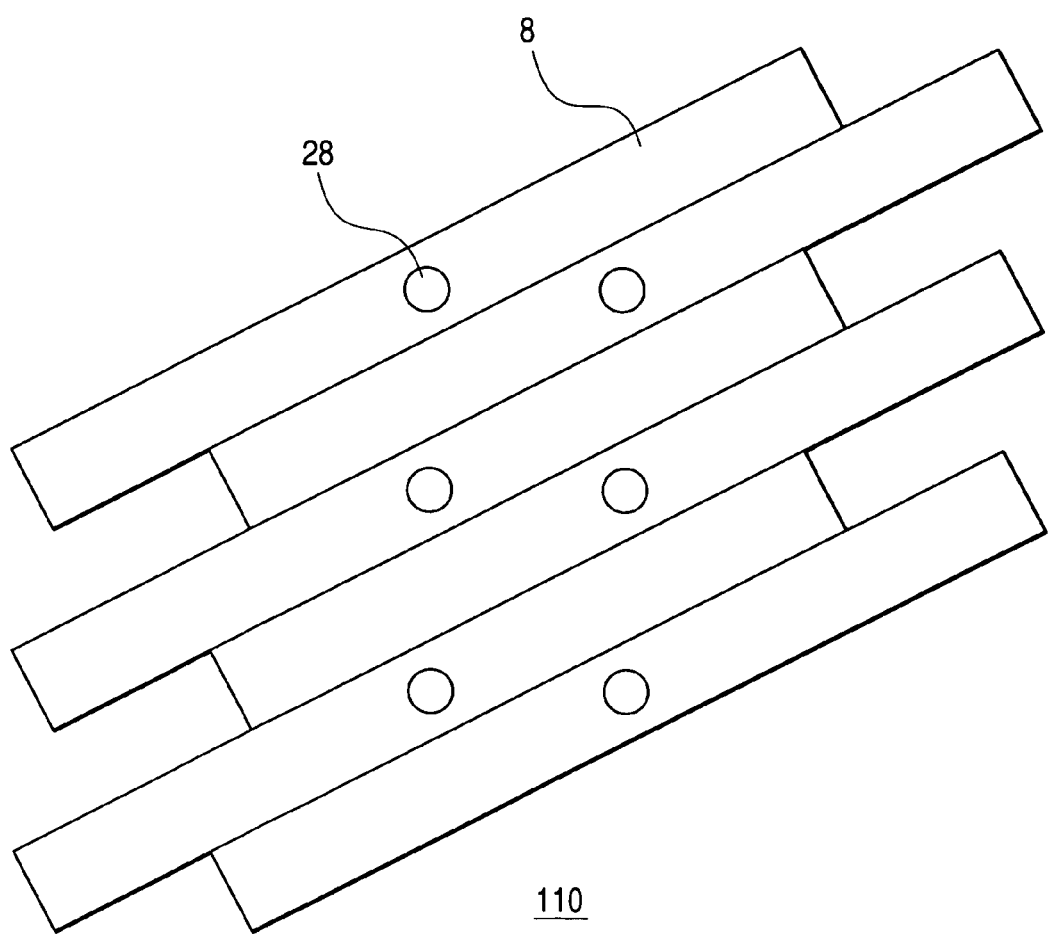
FIG. 11 is a top view of a braille device 110 formed by arranging the actuator module units 80 shown in FIGS. 8A and 8B into the 3×2 structure.

The braille device 100 is compact but has thickness of 15 mm or larger. A braille device with small thickness will be described referring to FIG. 11. FIG. 11 is a view seen from the upper portion of a braille device 110 having the actuator module units 80 arranged 3×2. The actuator module unit 80 is structured in accordance with conditions as described below so as to satisfy the specification of the braille.
(1) The width seen from the upper portion of the actuator module unit 80 is set to 0.98 mm for the purpose of setting the pitch of each pin to about 2.2 mm.
(2) As the pin is required to be vertically moved by 0.4 mm, the length of the actuator film 1 is set to the value equal to or longer than approximately 4 mm.

The thus structured six actuator module units 80 are arranged while being alternately displaced by 1.96 mm so as to form the braille device that displays the braille upon the voltage input to the arbitrary actuator module.

What is claimed is:

1. An actuator module comprising a container that contains an actuator film having both end portions fixed, a counter electrode provided to face the actuator film, an electrolyte solution and a gas therein,
wherein the electrolyte solution and the gas stored in the container serve to maintain an inside of the container under a positive pressure, and the container is at least partially provided with a flexible portion.

2. The actuator module according to claim 1, wherein a tension is applied to the actuator film within the container when a voltage is not applied to the actuator film.

3. The actuator module according to claim 1, further comprising a voltage application unit that applies one of a positive voltage and a negative voltage between the actuator film and the counter electrode.

4. The actuator module according to claim 3, wherein the actuator film makes a flexible motion when the voltage application unit applies one of the positive voltage and the negative voltage between the actuator film and the counter electrode.

5. The actuator module according to claim 4, wherein the container placed in an atmosphere has at least a portion that makes a flexible motion in response to the flexible motion made by the actuator film.

6. The actuator module according to claim 1, wherein the container has one end provided with a first fixation portion and the other end provided with a second fixation portion, the flexible portion with a hollow structure is provided between the first and the second fixation portions, one end of the actuator film is fixed to the first fixation portion, the other end of the actuator film is fixed to the second fixation portion, one end of the counter electrode is fixed to the first fixation portion, and the electrolyte solution and the gas are stored within the container air-tightly.

7. The actuator module according to claim 6, wherein the end of the actuator film fixed to the first fixation portion is fixed to a first electrode, and the end of the counter electrode is fixed to a second electrode.

8. The actuator module according to claim 1, wherein the actuator film is formed by binding conducting particles with an organic polymer.

9. The actuator module according to claim 1, wherein a separator is provided between the actuator film and the counter electrode, which is kept non-contact therewith.

10. The actuator module according to claim 1, wherein one of a conductive wire that serves to short-circuit the actuator film between both ends thereof, and a conductive wire that serves to short-circuit the actuator film at least a portion between arbitrary two points is provided.

11. The actuator module according to claim 1, wherein a portion to which the end of the actuator film is fixed, and a wall surface of the container in a longitudinal direction of the actuator film are formed of a non-flexible portion, and a portion to which the other end of the actuator film is fixed is provided with the flexible portion.

12. The actuator module according to claim 11, wherein a leading end of the actuator film that is fixed to the flexible portion is provided with an electrode and a pin, and a plurality of containers each having the electrode and the pin are arranged in line.

13. An actuator module comprising a container that contains an actuator film having both end portions fixed, first and second counter electrodes provided to face the actuator film, an electrolyte solution, and a gas therein, wherein:
   the electrolyte solution and the gas stored in the container serve to maintain an inside of the container under a positive pressure, and the container is at least partially provided with a flexible portion such that the actuator film is in an expanded state within the container when no voltage is applied to the actuator film; and
   one end of the first counter electrode is fixed to one end of the container, and one end of the second counter electrode is fixed to the other end of the container.

14. The actuator module according to claim 13, wherein the container has one end provided with a first fixation portion and the other end provided with a second fixation portion, the flexible portion with a hollow structure is provided between the first and the second fixation portions, one end of the actuator film is fixed to the first fixation portion, the other end of the actuator film is fixed to the second fixation portion, a first conductive wire serves to short-circuit the actuator film at one of a portion between both ends and arbitrary two points, a second conductive wire serves to short-circuit between the first and the second counter electrodes, and the electrolyte solution and the gas are stored within the container air-tightly.

15. The actuator module according to claim 13, comprising a first container and a second container in which an end of the actuator film fixed to the first fixation portion is fixed to a first electrode, an end of the actuator film fixed to the second fixation portion is fixed to a second electrode, an end of the first counter electrode is fixed to a third electrode, and an end of the second counter electrode is fixed to a fourth electrode, wherein the first electrode of the first container is connected to the second electrode of the second container via one of a first conductive wire and a wire, and the third electrode of the first container is connected to the fourth electrode of the second container via one of a second conductive wire and the wire.

16. The actuator module according to claim 15, wherein the first and the second containers receive commonly supplied power, and make flexible motions, respectively.

17. An actuator module comprising a container that contains first and second actuator films, first and second counter electrodes that face the first and the second actuator films, respectively, an electrolyte solution and a gas therein, wherein:
   the electrolyte solution and the gas stored in the container serve to maintain an inside of the container under a positive pressure;
   an end of the first actuator film is fixed to an end of the second actuator film with a conductive wire, and the other ends of the first and the second actuator films are fixed to the container in one of a direct way and an indirect way;
   a portion of the container to which the other end of the first actuator film is fixed, a side wall portion of the container to which the other end of the second actuator film is fixed, and a bottom surface of the container in a longitudinal direction of the first and the second actuator films are formed of one of a non-flexible portion and a non-flexible solid portion;
   an upper surface of the container is provided with a flexible portion; and
   one of a positive voltage and a negative voltage is applied between the first actuator film and the first counter electrode, and between the second actuator film and the second counter electrode for making a flexible motion of the first and the second actuator films so as to move a pin provided between the first and the second actuator films, which serves to force the flexible portion outward.

18. The actuator module according to claim 17, wherein the first and the second actuator films are arranged in line in a contracted state thereof, and a center portion of each of the first and the second actuator films has a sag portion in an expanded state.

19. The actuator module according to claim 17, wherein a plurality of containers each having the pin are arranged in line such that an arrangement of the pins serves as the braille.

20. The actuator module according to claim 17, wherein the container placed in an atmosphere has at least a portion that makes a flexible motion in response to the flexible motion made by the actuator film.

* * * * *